G. S. DUDLEY.
Grain-Rakers and Loaders.

No. 139,303. Patented May 27, 1873.

Witnesses:
P. C. Dieterich
T. Edgureck

Inventor:
G. S. Dudley
PER
Attorneys.

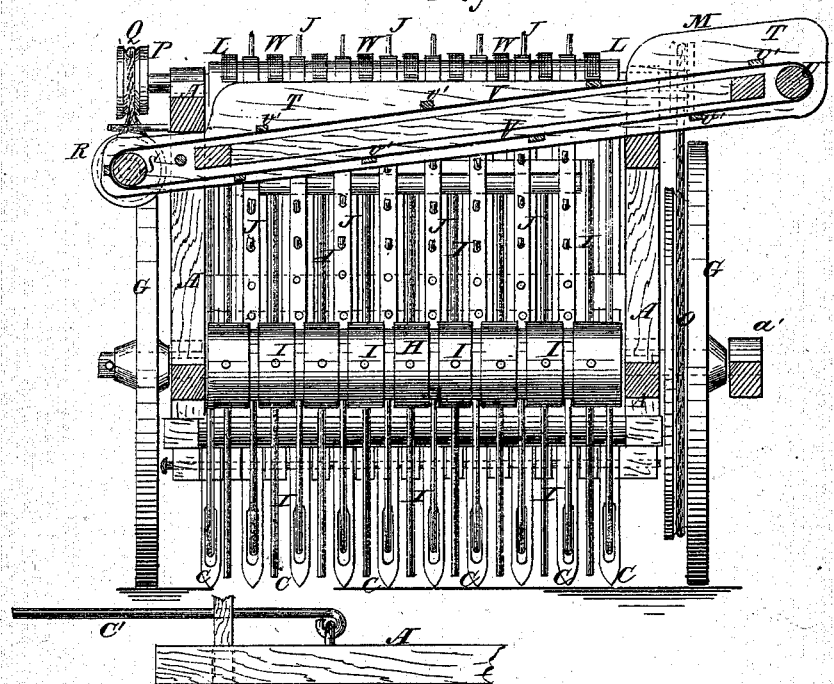
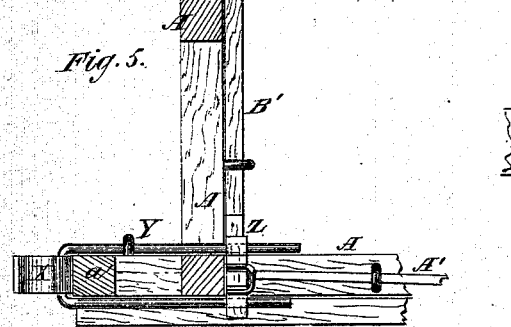
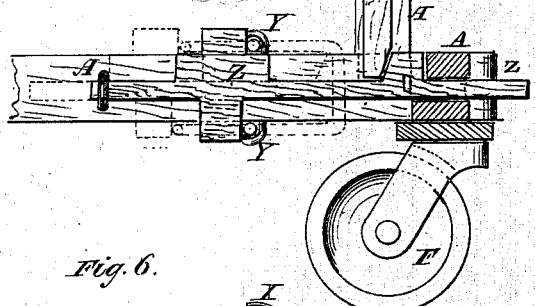
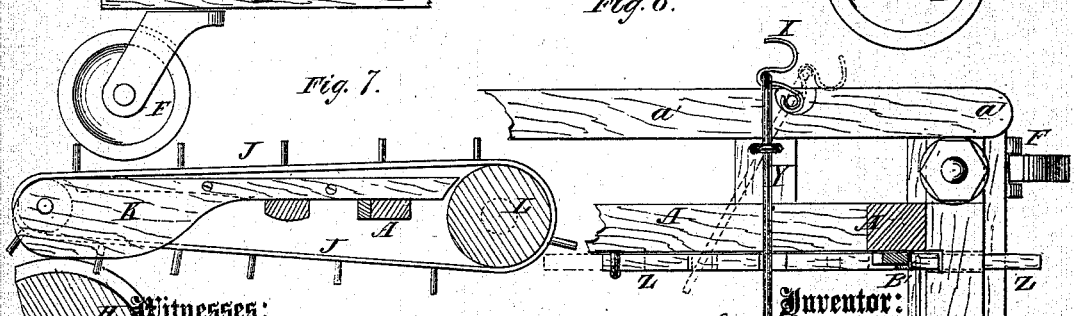

UNITED STATES PATENT OFFICE.

GEORGE S. DUDLEY, OF DIXON, CALIFORNIA.

IMPROVEMENT IN GRAIN RAKERS AND LOADERS.

Specification forming part of Letters Patent No. 139,303, dated May 27, 1873; application filed November 9, 1872.

*To all whom it may concern:*

Figure 1:
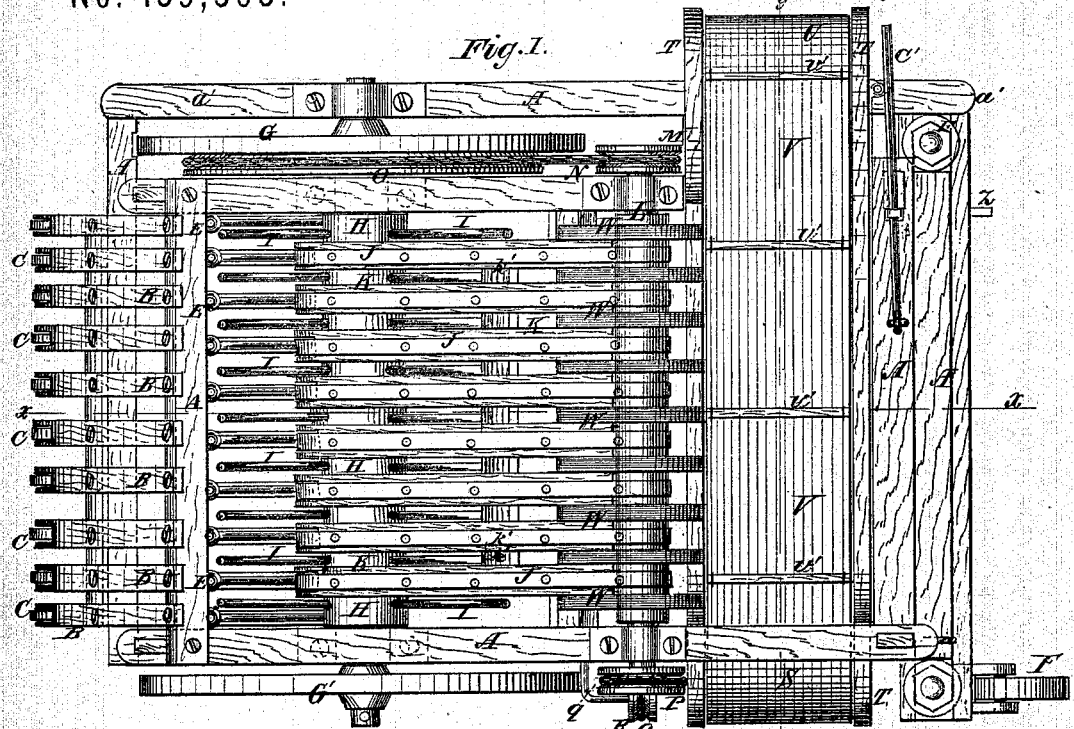
Figure 2:
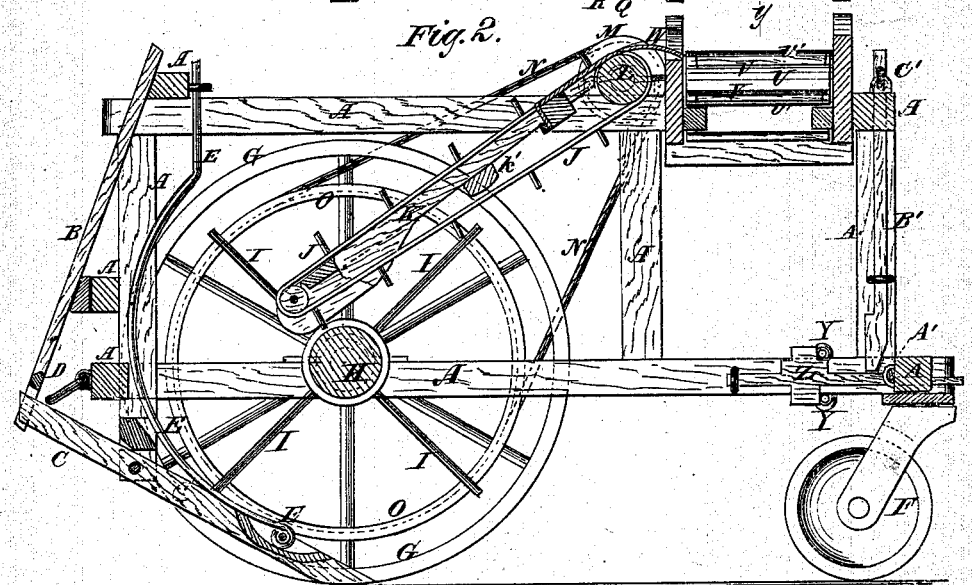

Be it known that I, GEORGE S. DUDLEY, of Dixon, in the county of Solano and State of California, have invented a new and useful Improvement in Harvesting-Rake, of which the following is a specification:

Figure 1, Sheet I, is a top view of my improved rake. Fig. 2, Sheet I, is a vertical longitudinal section of the same taken through the line $x\ x$, Fig. 1. Fig. 3, Sheet II, is a vertical cross-section of the same taken through the line $y\ y$, Fig. 1. Figs. 4, 5, and 6, Sheet II, are detail views, showing the device for connecting the rake with a wagon. Fig. 7, Sheet II, is a detail view of the elevator for raising the grain to the carrier.

Similar letters of reference indicate corresponding parts.

The invention consists in the improvement of harvester-rakes, as hereinafter described and pointed out in the claims.

A represents the frame-work of the machine, to the rear end of which is attached a series of parallel inclined bars, B. The lower ends of the bars B are slotted longitudinally to receive the upper or rear ends of the rake-teeth C, said rear ends resting against the bars B at the upper ends of the said slots when the points of the said teeth are in working position. The teeth C are pivoted to a cross-bar attached to the bottom of the rear end of the frame A, and are kept in proper relative position and parallel with each other by blocks placed between them and attached to said cross-bar, or by being placed in notches or transverse slots formed in said cross-bar. The forward ends of the teeth C are rounded off upon their lower sides to enable them to pass readily over any obstruction or unevenness of surface that may be encountered. D is a wide loop or armed rod, the ends of which are pivoted to a cross-bar of the frame A. When the teeth C are in working position the loop D rests in the angle between the bars B and teeth C, so that by pressing the said loop down into a vertical position the rear ends of the teeth C will be depressed, raising their forward ends away from the ground for convenience in turning or passing from place to place. E are guide-rods, the lower ends of which are inserted and pivoted in slots or grooves formed in the upper forward part of the teeth C. The guide-rods E are curved in the arc of a circle, except their upper parts, which are made straight and pass through keepers attached to an upper cross-bar of the frame A, as shown in Figs. 1 and 2, so that the said guide-rods E may work up and down freely as the teeth C move upon their pivots. The forward part of the machine is supported upon caster-wheels F and its rear part upon the wheels G, one of which revolves loosely upon one journal of the shaft, cylinder, or drum H, and the other is rigidly connected with the other journal of said cylinder H, so as to carry said cylinder with it in its revolution. To the cylinder H are attached four, more or less, rows of radial arms I, which are made of such a length that their outer ends, as the cylinder H revolves, will sweep through the spaces between the teeth C and guide-rods E without coming in contact with the ground or the frame-work of the machine. The cylinder H has ring-grooves formed in it, midway between the arms I, for the passage of the prongs of the endless belts J, which pass around rollers pivoted in the lower ends of the bars K, which ride upon the cylinder H, and the under sides of which have longitudinal grooves formed in them, which, in connection with the ring-grooves in the cylinder H, allow the pronged belts to pass, while the said ends rest upon the said cylinder. The upper parts of the bars K are attached to a cross-bar of the frame A, by which the elevator is mainly supported. The bars K are further connected and held in proper relative position by a cross-bar, $k'$, attached to them in such a position as not to interfere with the sweep of the arms I, which pass between the said bars K, as shown in Figs. 1 and 3. The upper ends of the bars K are concaved to fit upon the side of the cylinder or shaft L, around which the pronged belts J pass, and by which motion is given to said pronged belts J. The shaft L revolves in bearings attached to the forward part of the top of the frame A, and to one of its ends is attached a small pulley, M, around which passes a band, N, which also passes around a pulley, O, attached to or formed upon the wheel G, that drives the cylinder H. To the other end of the shaft L is attached a pulley, P, around which passes a band, Q, which also passes around a pulley, R, attached to the shaft S, which revolves in bearings in the lower end of the inclined carrier-frame T, attached transversely to the forward end of the upper part of the frame A. The upper end of the carrier-frame T rises so high, and projects so far, that the grain may readily pass from it to the wagon. To the upper end of the carrier-frame T is pivoted a shaft, U, around which and the shaft S passes an endless apron, V, to which cross-slats $v'$ are attached to prevent the grain from slipping upon said endless apron. By this construction the grain is raised from the ground by the teeth C, is raised from said teeth by the radial arms I, the guard-rods E keeping it from slipping from said arms while being raised. As the arms I pass a vertical position the grain falls upon the pronged belts J, by which it is carried to the carrier, by which it is deposited upon the wagon. The elevator-belts J should move sufficiently fast to carry the grain out of the way of the arms I, so that the said arms may pass down without being obstructed. W are guards which are attached to the cross-bar of the frame A, to which the upper parts of the bars K are attached between the said bars K. The guards W pass over the cylinder L, are curved downward, and overlap the inner side-bar of the carrier-frame T, to guide the grain into said carrier, and prevent it from being carried down by the pronged belts J.

I will now describe a device for connecting the rake with a wagon. To the near side of the frame A, and outside of the wheel G, is secured a bar, $a'$, to prevent the wagon upon which the grain is to be loaded from coming in contact with said wheel. To the bar $a'$, near its forward end, is pivoted a hook, X, which should have sufficient elasticity to prevent an injurious shock when the wagon is driven up. The wagon should be provided with a similar bar and hook. The hook X is made with a reverse-bend or loop to receive the bend of the U-shaped lever Y, the arms of which pass across the upper and lower sides of the bar $a'$, and the base-bar of the frame A, where they work in keepers, as shown in Figs. 4, 5, and 6. The ends of the arms of the lever Y rest against shoulders formed upon the bar Z, that slides in keepers upon the inner side of the base-bar of the frame A, and which is held forward by a spring, $A'$, attached to the front base-bar of the frame A. The sliding bar Z is locked by a bar, $B'$, sliding in keepers attached to a post of the frame A, and with the upper end of which is connected a lever, $C'$, pivoted to the top bar of the frame A, so that the sliding bar Z may be locked and unlocked as required. The rake may be connected with the wagon in any desired manner, or it may be drawn by a horse. In using the machine an empty wagon drives up, catches the rake, and draws it forward until loaded. The loaded wagon is then disengaged and driven to the stack, and an empty one drives up and takes its place.

Having thus described my invention, I claim as new and desire to secure by Letters Patent—

1. The combination of the slotted bars B, pivoted teeth C, guides E, shaft H, arms I, elevator J K L, guides W, and carrier S, U, V with each other, and with the frame-work of the machine, substantially as herein shown and described, and for the purpose set forth.

2. The combination of hook X, lever Y, the sliding shouldered bar Z, spring $A'$, sliding bar $B'$, and lever $C'$, applied as and for the purpose set forth.

GEORGE S. DUDLEY.

Witnesses:
I. C. MERRYFIELD.
HERMAN EPPINGER.